(12) United States Patent
Perrufel et al.

(10) Patent No.: US 10,887,934 B2
(45) Date of Patent: Jan. 5, 2021

(54) ACTIVATION OF COMMUNICATION INTERFACES OF A TERMINAL

(71) Applicant: Orange, Paris (FR)

(72) Inventors: Micheline Perrufel, Chatillon (FR); Sylvain Leroux, Chatillon (FR); Christophe Cutullic, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/336,887

(22) PCT Filed: Sep. 21, 2017

(86) PCT No.: PCT/FR2017/052533
§ 371 (c)(1),
(2) Date: Mar. 26, 2019

(87) PCT Pub. No.: WO2018/060571
PCT Pub. Date: Apr. 5, 2018

(65) Prior Publication Data
US 2019/0254092 A1   Aug. 15, 2019

(30) Foreign Application Priority Data

Sep. 27, 2016 (FR) ..................................... 16 59144

(51) Int. Cl.
*H04W 76/14* (2018.01)
*H04W 4/80* (2018.01)
(Continued)

(52) U.S. Cl.
CPC ............. *H04W 76/14* (2018.02); *H04W 4/80* (2018.02); *H04W 48/08* (2013.01); *H04W 48/18* (2013.01);
(Continued)

(58) Field of Classification Search
CPC .. H04B 10/11; H04W 36/0022; H04W 36/14; H04W 48/08; H04W 48/12; H04W 48/16;
(Continued)

(56) References Cited

U.S. PATENT DOCUMENTS 9,411,992 B1 * 8/2016 Marek ................ G06K 19/0709
2003/0228892 A1 12/2003 Maalismaa et al.
(Continued)

FOREIGN PATENT DOCUMENTS

WO    WO 03/105418 A2    12/2003

OTHER PUBLICATIONS

International Search Report and Written Opinion dated Mar. 16, 2018 for Application No. PCT/FR2017/052533.

*Primary Examiner* — Kan Yuen
(74) *Attorney, Agent, or Firm* — Knobbe, Martens, Olson & Bear LLP

(57) ABSTRACT

A terminal is described, along with a method for data processing carried out by the terminal, for communication via a plurality of interfaces of the terminal. The terminal can include a first interface for communication via a radiofrequency link, and a second interface for communication via a short-range link, where the second interface can be polluted by the radiofrequency link used by the first interface. The terminal can be configured to activate the first interface, deactivate the first interface and initiate a time-out during which the terminal can activate a third interface for communication via an optical link, and then activate the second interface.

15 Claims, 2 Drawing Sheets

Figure 1:
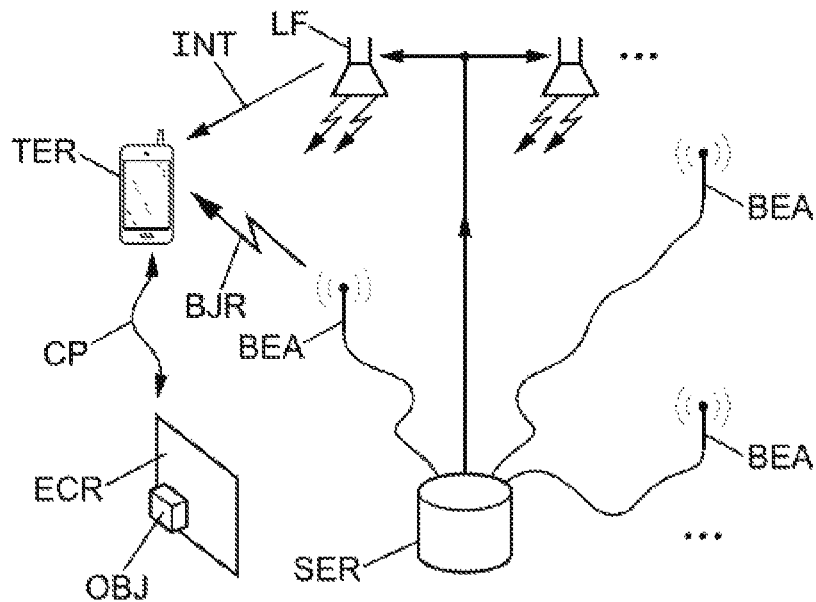

(51) Int. Cl.
   *H04W 48/18* (2009.01)
   *H04W 48/08* (2009.01)
   H04W 4/021 (2018.01)
   H04W 88/06 (2009.01)
   H04W 48/12 (2009.01)
   H04B 10/11 (2013.01)

(52) U.S. Cl.
   CPC .............. *H04B 10/11* (2013.01); *H04W 4/021* (2013.01); *H04W 48/12* (2013.01); *H04W 88/06* (2013.01)

(58) Field of Classification Search
   CPC ....... H04W 48/18; H04W 4/021; H04W 4/80; H04W 52/0274; H04W 52/028; H04W 74/00; H04W 74/02; H04W 76/14; H04W 76/15; H04W 76/23; H04W 76/27; H04W 88/06
   See application file for complete search history.

(56) References Cited

U.S. PATENT DOCUMENTS

| | | | |
|---|---|---|---|
| 2009/0086864 A1 | 4/2009 | Komninakis et al. | |
| 2013/0308506 A1* | 11/2013 | Kim | H04W 12/04 370/310 |
| 2016/0057619 A1* | 2/2016 | Lopez | G06Q 20/3825 380/247 |
| 2016/0134620 A1* | 5/2016 | Morrison | H04W 4/70 726/6 |
| 2016/0278006 A1* | 9/2016 | Lee | H04W 76/10 |

* cited by examiner

KEY: ECR = SCREEN, BJR = WELCOME MESSAGE, CP = SHORT RANGE

Key: TEMPO = TIME DELAY, DESA BLE = DEACTIVATE BLE

ACTIVATION OF COMMUNICATION INTERFACES OF A TERMINAL

RELATED APPLICATIONS

This application is the U.S. National Phase of Application No. PCT/FR2017/052533 entitled "IMPROVED ACTIVATION OF COMMUNICATION INTERFACES OF A TERMINAL" and filed Sep. 21, 2017, which claims the benefit of French Patent Application No. 1659144, filed Sep. 27, 2016, each of which is incorporated by reference in its entirety.

The present invention relates to data processing performed by a terminal, for communication via a plurality of interfaces of the terminal.

In particular, the terminal comprises at least:
a first interface for communication via a radio-frequency link, and
a second interface for communication via a short-range link.

It turns out that the first interface disrupts the proper operation of the second interface.

The present invention improves the situation.

For this purpose, it proposes a method for controlling a device comprising a first interface for communication via radio-frequency link according to a first radio access technology and a second interface for communication via radio-frequency link according to a second radio access technology, the method comprising:
activating the first communication interface to communicate according to the first radio access technology,
receiving an information signal on the first communication interface,
deactivating the first communication interface upon reception of the information signal, and
activating the second communication interface to communicate according to the second radio access technology.

With this arrangement, communication via the second interface is not contaminated by a possible persistence of communication according to the first radio technology.

As an example, the above device may be for example a terminal having the first and second interfaces, such as a smartphone, tablet, etc., typically having multiple communication interfaces (e.g. Bluetooth, NFC or RFID, WiFi LiFi, and/or others). In particular, a method is provided for controlling such a device and more particularly the communication interfaces of such a device, to prevent a communication according to the first radio technology, by continuing in an uncontrolled manner, from contaminating the communication according to the second radio technology. The communication of the device via the first interface may take place for example with a first access point according to a first radio technology and the communication via the second interface may take place with another access point according to a second radio technology that is different from the first technology. Thus, at least after receiving said information signal via the first interface (this information signal being broadcast by the first access point, for example), the first communication interface is deactivated in order to initiate a communication according to the other radio technology. For example, the terminal may receive a signal according to the first technology (e.g. Bluetooth) and prefer to deactivate the corresponding first interface (for example according to a pre-programmed user preference) in order to activate a communication via the second communication interface instead (e.g. near field), if the user is not specifically preparing to use the first technology for example.

In one embodiment, the method comprises:
applying a time delay between deactivation of the first interface and activation of the second interface.

However, alternatively, in particular when the terminal further comprises a third interface for communication, for example via an optical link, the method may further comprise:
activating:
the first interface, then
the third interface for communication via optical link, after deactivation of the first interface, then
the second interface.

By means of such arrangements, the device can take advantage of the delay in order to activate another communication interface during said delay, for example an optical communication interface such as LiFi which has a communication protocol considered as taking a long time to load.

In one possible context for application of the method, said information signal is related to the presence of at least one radio-frequency beacon capable of entering into communication with the device.

In one embodiment, said information signal comprises in particular a radio-frequency beacon identifier. This identifier may be for example broadcast by one or more beacons according to the first radio technology, in an area entered by the device. Reception of the identifier can then trigger, at the device, deactivation of the first interface and subsequently activation of the second interface, particularly if the received beacon identifier characterizes an area in which the device is likely to have to communicate according to the second radio technology as well. This area may be an exhibition space for example, comprising for example access points according to the second radio technology for communicating multimedia content for example to users equipped with devices of said type and thus providing an interaction with such users.

In such an embodiment, the first communication interface may then be deactivated upon reception of a predetermined radio-frequency beacon identifier (typically corresponding to an identifier for which the device must be ready for communication according to the second radio technology).

Alternatively, the information signal may comprise a notification of detection of the device within a coverage area of one or more radio-frequency beacons. Such an embodiment thus goes beyond simply receiving a beacon identifier at the device. Once the device is detected within the coverage area, such an embodiment may include communicating an identifier of the device to at least one of the beacons in order to send personalized content to the device if the user of the device (and more particularly the identifier of the device) is listed in a database which can be accessed by the access points according to the second radio technology.

In one embodiment, the first radio access technology is Bluetooth or Bluetooth Low Energy (BLE). Communication according to this radio protocol tends to contaminate subsequent communications according to other types (especially according to said second technology).

In one embodiment, the second technology is a near-field communication such as Near Field Communication (NFC) technology, or a radio-frequency identification technology such as Radio-Frequency Identification (RFID) technology, or communication via ultrasound.

For example, the second communication interface makes use of a secondary radio-frequency link that does not require launching a protocol specific to this secondary radio-frequency link (as is the case at least for short-range radio-frequency communications such as NFC or RFID).

In one embodiment, the third interface implements a Light Fidelity (LiFi) type of optical communication. This LiFi communication may be one-way (only a downlink to the device), or two-way.

In one embodiment, the method further comprises:
executing a first application for establishing a communication via the first communication interface according to a first protocol, then
executing a second application for establishing a communication via the third communication interface according to a second protocol.

Such an embodiment allows loading the optical communication protocol (which for a LiFi communication can take a long time to bad, as indicated above) immediately after activation of the first interface.

In one embodiment, the method further comprises:
activating the first communication interface, at the device, at least to receive said information signal from a radio-frequency beacon, and deactivating the first communication interface,
activating the third communication interface to receive data from a lamp for transmitting data by optical communication, and
activating the second interface to establish an interaction by near-field link according to the second radio technology, between the device and at least one connected object.

Such an embodiment is described in detail below, particularly with reference to FIG. 1.

Figure 3:
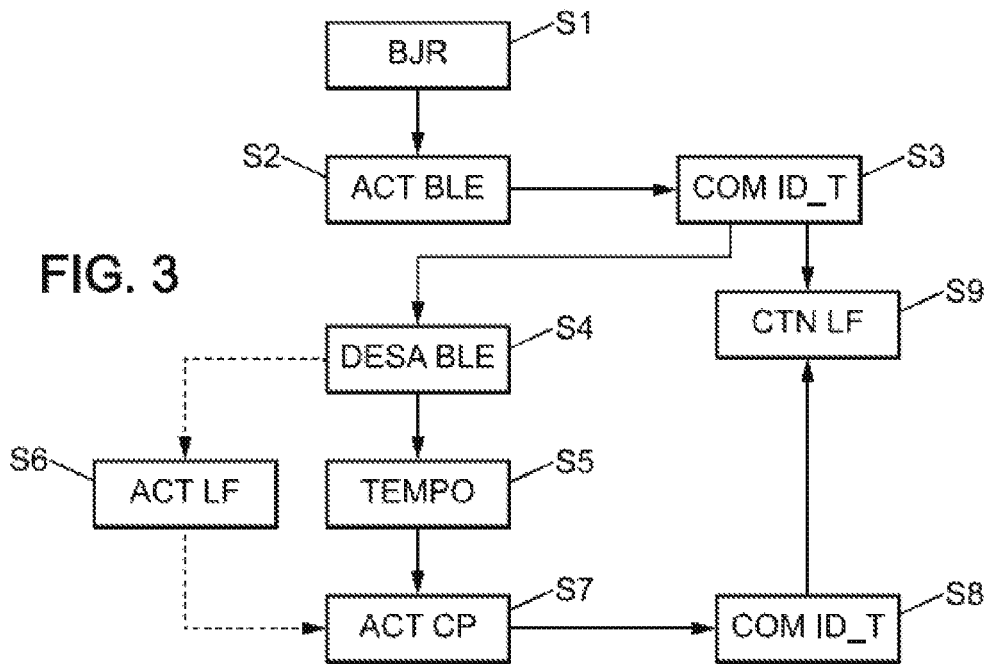
Figure 4:
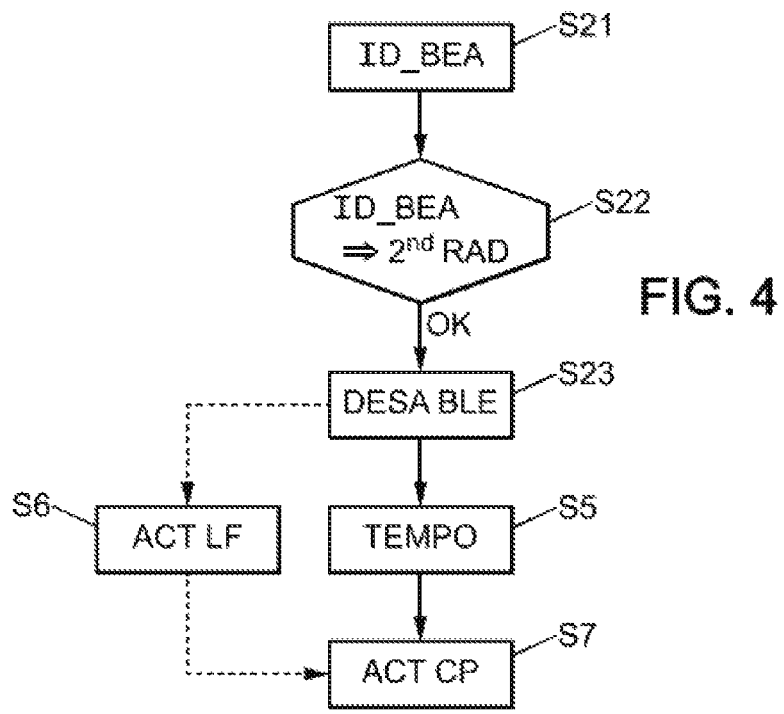

The invention also relates to a computer program comprising instructions for implementing the above control method when this program is executed by a processor (FIG. 3, or alternatively FIG. 4, illustrating examples of possible flowcharts for such a program).

The invention also relates to a communication device comprising:
a first interface for communication via radio-frequency link according to a first radio access technology,
a second interface for communication via short-range radio-frequency link according to a second radio access technology, and
a processor, operably coupled to the first and second communication interfaces,
wherein the processor is configured to implement the above control method.

In one embodiment, the processor is in particular configured to execute a software development kit (common abbreviation "SDK") programmed to perform the successive activations and deactivations of the first and second communication interfaces of the device.

Thus, with one initial programming, the terminal is configured to interact via at least the first and second communication interfaces, without any disruption, and to do so for any type of interaction context.

The invention also relates to a system for implementing the method according to the specific embodiment of an interaction of the terminal with one or more beacons on site. In particular, such a system comprises at least:
a radio-frequency beacon,
a content server connected to the beacon, and
at least one lamp connected to the content server, configured to broadcast content data originating from the content server via optical communication.

In particular, the beacon is arranged to detect, by radio-frequency communication, the presence of a communication device located within a coverage area of the beacon, and upon such detection to transmit at least information concerning the presence of the device to the content server, causing transmission of data from the content server to the device via optical communication by means of the lamp.

Of course, the device is of the type defined above and thus comprises a first interface for communication via radio-frequency link according to a first radio access technology, a second interface for communication via radio-frequency link according to a second radio access technology, and a third interface for communication via optical link, the device being configured to activate:
the first interface, then
the third interface for communication via optical link, after deactivation of the first interface, then
the second interface.

Such an embodiment, described in detail below, is used to enrich the experience of the terminal user without subsequently disrupting the operation of the near-field communication.

Figure 2:
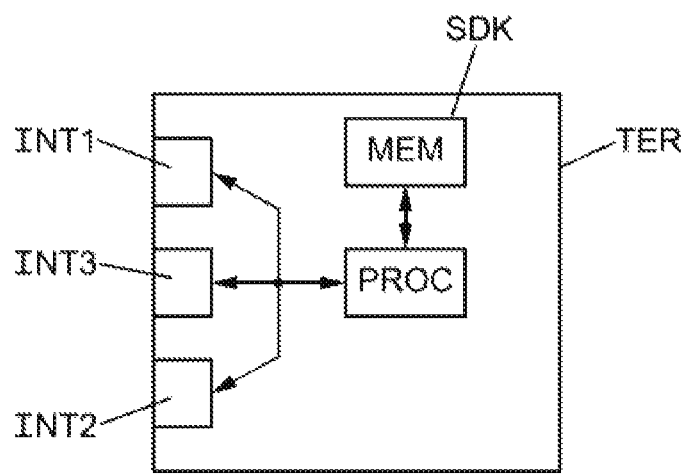

Other features and advantages of the invention will be apparent from reading the following detailed description of some exemplary embodiments of the invention, and from reviewing the accompanying drawings in which:

FIG. 1 illustrates a system for implementing the invention, in one particular embodiment;

FIG. 2 schematically illustrates a terminal for implementing the invention;

FIG. 3 schematically illustrates the steps of a method according to the invention; and FIG. 4 schematically illustrates the steps of a method according an alternative embodiment to the one illustrated in FIG. 4.

The invention is applicable in particular but not exclusively to communication with one or more beacons arranged in a common location (for example a department store, a museum, an information center, etc.), the beacons being connected for example to a shared information server.

Referring to FIG. 1, a terminal TER (for example a smartphone or similar) entering an area covered by beacons BEA receives a notification from one of these beacons, for example a welcome message BJR for said area. This message is sent via a Bluetooth® radio-frequency link (such as the Bluetooth® Low Energy protocol, or BLE). This message may further include an address of the server SER and may invite the terminal user (via a human/machine interface) to retrieve information from the server SER about objects in the area for example (typically informative content about the works of art in a museum, or about products). The transmission of such information INF from the server SER to the terminal TER may occur by connection to a WiFi base station connected to the server. In the particular embodiment shown in FIG. 1, the link for receiving information data INF is optical, and more particularly LiFi (for "Light Fidelity"). This typically is a wireless communication technology based on the use of visible light that can be emitted by lamps (denoted LF in FIG. 1) such as LED for example, but at a higher frequency than the persistence of vision, which therefore does not bother users.

Furthermore, in order to make the objects OBJ on exhibit in the area more attractive for users, means of interaction with the user may further be provided. These may be for example an animation on a screen ECR that launches when the user approaches the object OBJ, or more specifically when his or her terminal TER is detected near the object OBJ by a short-range radio-frequency link CP (REID or NFC type of near-field). However, it turns out that in this context there is an incompatibility between using a radio-frequency link (particularly BLE) and a short-range radio-frequency link CP. More particularly, it has been observed that launching the application on the terminal in order to activate the relatively long-range radio-frequency link (BLE) prevents proper operation of the near-field radio-frequency link, while launching only the application for the short-range radio-frequency link on the same terminal would work correctly.

The present invention therefore proposes, with reference to FIG. 2, configuring the terminal TER, and more particularly programming a software development kit (SDK) for the terminal, so as to create a time delay between the activation then deactivation of the BLE communication interface, before activating the short-range communication interface CP.

Thus, in the embodiment of FIG. 2 where the terminal TER comprises:
- a first communication interface INT1, for a relatively long-range radio-frequency link (for example Bluetooth BLE),
- a second communication interface INT2, for a short-range link (typically near-field such as NFC or REID),
- a third communication interface INT3, for example via an optical link (such as LiFi for example),
- a processor PROC (or any circuit for controlling communication interfaces) connected to said interfaces INT1, INT2, INT3 in order to control their activation/deactivation, and
- a memory MEM connected to the processor PROC and able to store software for implementing the invention, such as an SDK, the terminal can create a time delay between deactivating the first interface INT1 and activating the second interface INT2, and in particular can take advantage of this delay to initiate activation of the third interface INT3 during this delay.

Indeed, it has been further observed that the effects of persisting communication according to the Bluetooth protocol (or more particularly BLE) at the terminal, do not disrupt the initiation of an optical communication, for example according to the LiFi protocol, but do disrupt near-field communications.

Thus, with reference to FIG. 3, upon detection of a radio-frequency beacon in step S1, the terminal activates the BLE interface in step S2 in order to initiate a communication with the beacon and more particularly in step S3 to send for example a terminal identifier ID_T to one of the beacons. As these first steps consist of establishing contact with a particular beacon, the terminal is then configured (SDK application), in the case of communication with a beacon, to then immediately disable the BLE interface in step S4 and apply a time delay S5 before establishing a short-range type of communication S7 (NFC or REID). Here, the terminal (SDK application) advantageously makes use of this delay to load the LiFi protocol (relatively time-consuming) by activating the optical interface in step S6. The beacon (or beacons) at the site is (are) also connected to a content server SER in order to transmit the identifier ID_T of the terminal. Thus, the server SER is able to send content relevant for the user of the terminal based on the identifier ID_T (for example content targeted to a user subscribing to a service at the site, or other), and to do so via a LiFi signal by one or more LED lamps of the site, near the beacon, in step S9. Then, an interaction by short-range communication (NFC or RFD) can occur with an object OBJ of the site in step S7 without being contaminated by the BLE protocol. Here again, the object OBJ may be connected to the server SER and an identifier of the terminal ID_T may be communicated to the connected object in step S8 in order to launch content tailored to the user's terminal (for example on the screen ECR on site, or directly on a screen of the terminal TER).

In the alternative embodiment shown in FIG. 4, in step S21 the terminal simply receives via the BLE interface a signal having a radio-frequency beacon identifier ID_BEA. Thus, in step 322 the terminal can compare this identifier ID_BEA with at least the types of identifiers listed (for example in the memory MEM) in order to determine whether the type of beacon identifier received ID_BEA corresponds to a site for which it is preferable to disable the BLE interface. Such a site may typically be an area in which a communication according to a second radio technology (other than Bluetooth in the example described) is likely to occur thereafter (for example a near-field communication with the connected objects OBJ, at the site). Thus, after the test step S22 carried out by the terminal, if the type of identifier received ID_BEA requires disabling the BLE interface (OK arrow exiting test S22), then the BLE interface is immediately disabled in the following step S23. Next, the method can continue as described above with reference to FIG. 3, with:
- in step S5, a time delay triggered before activating, in step S7, the interface according to the second radio technology, and
- in step 36, during this delay, loading the LiFi protocol in order to receive content via the lamps LF as described above with reference to FIG. 1.

It should be noted that the LiFi communication may be two-way, and for terminals having the capability of sending the LiFi signal to a receiver connected to the server SER, it is possible to transmit an identifier of the terminal ID_T via this optical link to the server SER in order to receive personalized content On a manner equivalent to step S9 described above with reference to FIG. 3).

The invention advantageously applies to services for the interaction of a terminal with a connected environment using communication modes such as BLE, LiFi, NFC, etc. It offers a comprehensive solution which avoids the use of individual and isolated technical solutions that are therefore suboptimal for an interaction supporting the customer experience.

When scanning a mobile terminal on the various communication interfaces in order to detect presence beacons, the invention makes it possible to avoid interference between the loading of the BLE protocol on the terminal and the other radio-frequency communications, particularly near-field (NFC or RFID). The time delay in activating the BLE protocol, followed by its deactivation, avoids contaminating any subsequent scan for a secondary radio-frequency communication.

In known prior art implementations, a beacon administrator (for example a museum or department store) is confronted with such a problem of BLE contamination if the beacons are associated with other technologies, and each administrator must manage these different technologies with an equal number of different use cases. Once an SDK application properly configured according to the method of FIG. 3 or FIG. 4 is installed on the terminal, the application executed by the terminal in the case of beacon detection is universal for any service, and this single application remains compatible with the different beacon technologies and other means of interaction.

The invention provides a single SDK application capable of supporting numerous modes of communication (LiFi, ultrasound, BLE, LORA, NFC), BLE and short-range radiofrequency communication in particular. The invention also allows managing a customer experience supporting multiple technologies and associated messages. It is based on the observation that the scanning order can reduce contamination related to the BLE protocol, if a time delay is applied or if the receiving of data other than radio-frequency data (LiFi for example) is placed between the BLE application and a secondary radio-frequency application.

Of course, the invention is not limited to the embodiments described above as examples; it extends to other variants.

For example, described above was the LiFi broadcasting of content adapted to the terminal. This is an exemplary embodiment and in a less sophisticated variant, content not fled to the identity of the terminal user can be broadcast immediately after detection by a beacon of the presence of a terminal that has entered the site. Such an embodiment may be provided for example in the embodiment of FIG. 4, if the LiFi communication is one-way only.

The invention claimed is:

1. A method of controlling a communication device, the communication device comprising a first interface for communication via radio-frequency link according to a first radio access technology and a second interface for communication via radio-frequency link according to a second radio access technology, the method comprising:
    activating the first communication interface to communicate according to the first radio access technology;
    receiving an information signal via the first communication interface;
    deactivating the first communication interface upon reception of the information signal;
    activating the second communication interface to communicate according to the second radio access technology; and
    after deactivation of the first interface and prior to activation of the second interface, activating a third interface for communication via an optical link.

2. The method of claim 1, further comprising applying a time delay between deactivation of the first interface and activation of the second interface.

3. The method of claim 1, wherein the information signal comprises a radio-frequency beacon identifier.

4. The method of claim 3, wherein the first communication interface is deactivated upon reception of a predetermined radio-frequency beacon identifier.

5. The method of claim 1, wherein the information signal comprises a notification of detection of the device within a coverage area of one or more radio-frequency beacons.

6. The method of claim 1, wherein the first radio access technology is Bluetooth.

7. The method of claim 1, wherein the second technology is a near-field communication technology, a radio-frequency identification technology, or communication via ultrasound.

8. The method of claim 1, wherein the third interface implements a Light Fidelity, LiFi, type of optical communication.

9. The method of claim 1, further comprising:
    executing a first application for establishing a communication via the first communication interface according to a first protocol; and
    after executing the first application, executing a second application for establishing a communication via the third communication interface according to a second protocol.

10. The method of claim 1, wherein:
    activating the first communication interface comprises activating the first communication interface, at the device, to receive said information signal from a radio-frequency beacon,
    activating the third communication interface comprises activating the third communication interface to receive data from a lamp for transmitting data by optical communication, and
    activating the second communication interface comprises activating the second communication interface to establish an interaction by near-field link according to the second radio technology, between the device and at least one connected object.

11. A system for implementing the method of claim 10, the system comprising:
    a radio-frequency beacon,
    a content server connected to the beacon, and
    at least one lamp connected to the content server, the at least one lamp configured to broadcast content data originating from the content server via optical communication,
    wherein the beacon is arranged to:
        detect, by radio-frequency communication, the presence of a communication device located within a coverage area of the beacon, and
        upon such detection, transmit at least information concerning the presence of the device to the content server, causing transmission of data from the content server to the device via optical communication by means of the lamp.

12. A non-transitory computer readable medium comprising instructions which when executed by a processor cause the processor to implement the control method of claim 1.

13. A communication device comprising:
    a first interface for communication via radio-frequency link according to a first radio access technology,
    a second interface for communication via short-range radio-frequency link according to a second radio access technology, and
    a processor, operably coupled to the first and second communication interfaces,
    wherein the processor is configured to implement the control method of claim 1.

14. The communication device of claim 13, wherein the processor is further configured to execute a software development kit programmed to perform the successive activations and deactivations of the communication interfaces of the device.

15. The method of claim 1, wherein the first radio access technology is Bluetooth Low Energy.

* * * * *

UNITED STATES PATENT AND TRADEMARK OFFICE
CERTIFICATE OF CORRECTION

| | | |
|---|---|---|
| PATENT NO. | : 10,887,934 B2 | Page 1 of 1 |
| APPLICATION NO. | : 16/336887 | |
| DATED | : January 5, 2021 | |
| INVENTOR(S) | : Micheline Perrufel et al. | |

It is certified that error appears in the above-identified patent and that said Letters Patent is hereby corrected as shown below:

In the Specification

In Column 3, Line 16, delete "bad," and insert --load,--.

In Column 4, Line 66, delete "(REID" and insert --(RFID--.

In Column 5, Line 23, delete "REID)," and insert --RFID),--.

In Column 5, Line 54, delete "REID)." and insert --RFID).--.

In Column 5, Line 65, delete "RFD)" and insert --RFID)--.

In Column 5, Line 67, delete "protocol," and insert --protocol.--.

In Column 6, Line 9, delete "322" and insert --S22--.

In Column 6, Line 28, delete "36," and insert --S6,--.

In Column 6, Line 36, delete "On" and insert --(in--.

In Column 7, Line 14 (approx.), delete "fled" and insert --tied--.

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*